US006626758B1

(12) United States Patent
Parham et al.

(10) Patent No.: US 6,626,758 B1
(45) Date of Patent: Sep. 30, 2003

(54) RANDOM PAY GAMING METHOD AND SYSTEM

(75) Inventors: Tyler Thomas Parham, Reno, NV (US); Richard E. Michaelson, Reno, NV (US)

(73) Assignee: Gaming Enhancements, Inc., Reno, NV (US)

( * ) Notice: Subject to any disclaimer, the term of this patent is extended or adjusted under 35 U.S.C. 154(b) by 0 days.

(21) Appl. No.: 09/916,242

(22) Filed: Jul. 25, 2001

Related U.S. Application Data

(60) Provisional application No. 60/220,488, filed on Jul. 25, 2000.

(51) Int. Cl.[7] ................................................ A63F 13/00
(52) U.S. Cl. ............................................ 463/25; 463/42
(58) Field of Search ........................ 463/12, 13, 16–20, 463/22, 25–29, 40–42, 44; 700/90, 91; 273/138.1, 143 R, 139, 292, 293, 309

(56) References Cited

U.S. PATENT DOCUMENTS

| | | | | | |
|---|---|---|---|---|---|
| 4,448,419 | A | | 5/1984 | Telnaes | |
| 4,582,324 | A | * | 4/1986 | Koza et al. | 463/16 |
| 5,280,909 | A | | 1/1994 | Tracy | |
| 5,655,961 | A | | 8/1997 | Acres et al. | |
| 5,702,304 | A | | 12/1997 | Acres et al. | |
| 5,741,183 | A | | 4/1998 | Acres et al. | |
| 5,743,800 | A | * | 4/1998 | Huard et al. | 463/12 |
| 5,752,882 | A | | 5/1998 | Acres et al. | |
| 5,836,817 | A | | 11/1998 | Acres et al. | |
| 6,032,955 | A | * | 3/2000 | Luciano et al. | 273/138.1 |
| 6,089,976 | A | * | 7/2000 | Schneider et al. | 273/138.1 |
| 6,110,043 | A | | 8/2000 | Olsen | |
| 6,146,273 | A | | 11/2000 | Olsen | |
| 6,217,448 | B1 | | 4/2001 | Olsen | |

* cited by examiner

*Primary Examiner*—Paul J. Hirsch
*Assistant Examiner*—Patrick Buechner
(74) *Attorney, Agent, or Firm*—Townsend, Townsend & Crew LLP

(57) ABSTRACT

The method of the present invention allows a player who bets the proper wager amount and initiates game play on one or more new or existing electronic or computer-controlled gaming devices, to become eligible to win one or more randomly selected monetary percentages as a function of a random number from 0 to 100% of an entire fixed or progressed prize pool with or without regard to game outcome. If the gaming device is networked to a progressive gaming system, a percentage of each gaming wager from at least one gaming device and/or a percentage of non-gaming revenues e.g., rooms, food, beverage, etc., may be contributed to the total progressive pool amount.

69 Claims, 1 Drawing Sheet

RANDOM PAY GAMING METHOD AND SYSTEM

CROSS-REFERENCES TO RELATED APPLICATIONS

This application claims priority for U.S. Provisional Application No. 60/220,488, entitled “Random Pay Gaming Method”, filed on Jul. 25, 2000, which is herein incorporated by reference in its entirety for all purposes.

BACKGROUND OF THE INVENTION

The present invention is related generally to gaming systems and more specifically to a gaming device system and method for awarding payouts and prizes.

Conventional gaming devices for awarding payouts when a wager is taken at a casino for example, are well known. A gaming device uses a random selection process to determine the game outcome of each play of a game. When a gaming device correctly displays at least one randomly predetermined set of indicia, the player is awarded a predetermined payout that is display in a payout schedule.

Conventional gaming devices have a top award called a jackpot that is limited by the probability of aligning a finite number of jackpot indicia. In order for a gaming device to remain profitable over time, the amount of awards multiplied by the probability of winning the awards is less than the average amount wagered in winning the awards. In order for a gaming device to payout a large predetermined jackpot, for example, $100,000, the odds of winning the jackpot must be extremely high in order for the machine to be profitable over time. Because of this, it normally takes long periods of time between large jackpot payouts. Even though players are still attracted to the opportunity of winning a $100,000 dollars, disadvantageously, because of the low frequency of winners and the extremely low probability of winning, players tend to lose interest in playing and tend to move on to games that have a higher frequency of winning a jackpot.

Conventional progressive gaming systems have been used to produce progressive pools, ranging from thousands to millions of dollars by using a progressive gaming system in conjunction with a gaming device or devices. In most of these systems, a number of gaming devices and or location are coupled to a central computer system. As wagers are placed in the gaming devices, a portion of each wager is contributed to at least one progressive pool. As contributions are made to the progressive pool, the size of the pool grows until it is awarded to a player. When the player properly aligns a predetermined set of indicia on the gaming device the entire pool is payment. These progressive amounts are displayed on the gaming device and/or showcased on a display above the individual gaming device or a group of gaming devices.

While the above gaming devices and progressive gaming system with its added progressive pool have proved satisfactory in stimulating game play on the coupled gaming devices, disadvantageously, it has been observed that game play tends to decrease immediately after the total progressive pool has been won. Not until the displayed current pool value increases considerably above the initially reset base value does game play increase to its more usual levels. This fall-off in game play is a result of the players on the gaming devices being reluctant to institute game play when the displayed current pool value is close to the initial base value, since the players know that the value will likely increase to a more substantial level. Fall-off in game play at any time is undesirable and detracts from the benefits of the added progressive gaming system.

It should be observed that increased payoffs are being demanded by the market to maintain and increase player appeal. Nevertheless, the probability of win and payout that allows for a reasonable business profit must be assured to casino owners. Generally the profit-hold objectives before taxes and operational costs that are deducted are in a range as low as 2.7% and generally up to 15%. Hence, the higher payoffs for a winning indicia combination is counterbalanced with less probability for the high win combination of indicia.

Disadvantageously, the probability of hitting a large progressive award on a gaming device i.e., Mega Bucks/IGT “the worlds biggest slot Jackpot”™, is extremely low, thus causing long periods of time to pass by, between winners, of the large progressive award pools. Even though players are still attracted to the chance of winning over a million dollars, because of the low frequency of winners and the extremely low probability of winning, players tend to lose interest in playing and tend to move on to games that have higher odds frequency of winning jackpots.

In addition, progressive pools increase as wagers are placed in the gaming devices, a portion of each wager is contributed to at least one progressive pool. As contributions are made to the progressive pool, the size of the pool grows until it is awarded to a player. Because a portion of the wager from each gaming device is the only way to contribute to the progressive pool, when game play (coin-in) decreases the progressive pool increments at a slower rate, causing less excitement and player appeal. Disadvantageously, because of this and fall-off, progressive pools can remain stagnant for long periods of time creating a loss in revenues for the Gambling Establishments.

Therefore there is a need to resolve the aforementioned disadvantages relating to conventional gaming devices and progressive systems and the present invention meets this need.

BRIEF SUMMARY OF THE INVENTION

Various aspects of the present invention can be found in a random pay gaming method and system (RPGM) as disclosed in the present invention. According to a first aspect of the present invention, a method of random payout from a prize pool is disclosed. The method employs one or more gaming devices connected to a controller. When a player bets a proper wager amount, and play is initiated on the gaming device, the player becomes eligible to one or more selected percentages from 0 to 100% of an entire prize pool on any participating gaming device before during or after game play with or without regard to game outcome. The randomly selected percentage may be from progressive or fixed prize pool.

According to an alternate aspect of the present invention, the gaming device is coupled to a progressive prize pool. Upon receiving the proper wager amount, a percentage of each gaming wager from at least one gaming device and/or a percentage of non-gaming revenues e.g., rooms, food, beverage, etc., is contributed to the total progressive pool amount. The monetary prize pool award that the player is eligible to win may or may not be displayed.

According to another aspect of the present invention, a method of random payout from a prize pool is disclosed. The method employs a network having one or more gaming devices communicably coupled to a controller. Among other elements, the method comprises: (1) receiving a wager amount; (2) receiving an input to initiate game play; (3) qualifying the wager amount to win a percentage of the entire prize pool, the percentage of the entire prize pool being a function of a random number; and (4) the win being capable of occurring at the following periods: (a) during game play; or (b) after game play.

According to another aspect of the present invention, the method further comprises allocating a portion of the wager amount to the progressive prize pool.

According to another aspect of the present invention, the method further comprises allocating a portion of the non-gaming revenues to the progressive prize pool.

According to another aspect of the present invention, the method further comprises displaying a bonus indicia for disguising the percentage of the entire prize pool, the percentage being displayed only after a winning bonus indicia is selected.

According to another aspect of the present invention, the method further comprises: (1) displaying a first payout amount corresponding to a selected winning indicia for the gaming device; and (2) after receiving a wager amount, providing an opportunity to win a second payout amount corresponding to the selected winning indicia.

According to another aspect of the present invention, the method further comprises incrementing the portion of the wager amount to the progressive prize pool.

According to another aspect of the present invention, the method further comprises: (1) selecting a predetermined winning indicia; (2) awarding a predetermined payout amount corresponding to the winning indicia; and (3) awarding the monetary amount for the game play only.

According to another aspect of the present invention, the method further comprises: (1) if a percentage less than 100% is won, reducing the entire progressive prize pool by an amount won to determine an unwon amount; and (2) carrying over the unwon amount for a next opportunity to win a percentage of the progressive prize pool.

According to another aspect of the present invention, a method of random payout from a progressive prize pool is disclosed. The method utilizes one or more video gaming devices with display screens which are coupled to a controller. The method includes: (1) receiving, by the video gaming device, a wager amount; (2) receiving an input to initiate game play; (3) contributing a portion of the wager amount to the progressive prize pool; and (4) qualifying the wager amount to win one or more additional awards from the progressive prize pool without regard to game out come.

According to another aspect of the present invention, the method further comprises providing a bonus award cycle for displaying the one or more additional awards, the additional awards are selected from the group comprising a bonus award, a non-bonus award and a bonus award cycle terminator.

According to another aspect of the present invention, the method further comprises displaying the bonus award, the non-bonus award and the bonus award cycle terminator in a disguised manner.

According to another aspect of the present invention, the method further comprises receiving one or more inputs for selecting as many of the disguised additional awards prior to expiration of the bonus award cycle.

According to another aspect of the present invention, the bonus award cycle further comprises: (1) storing a predetermined amount contributed to the progressive pool from the gaming device; (2) triggering a bonus cycle when the predetermined amount is reached.

According to another aspect of the present invention, the method further comprises determining a bonus award prize percentage from the progressive prize pool; determining the one or more additional awards; and dividing the bonus award prize percentage by a total number of additional awards determined.

According to another aspect of the present invention, the method further comprises wherein the one or more additional awards displayed are static or dynamic.

According to another aspect of the present invention, a method of payout from a progressive prize pool is disclosed. The method employing a controller communicably coupled to one or more video gaming devices, the method comprises: a) receiving, by a video gaming device, a wager amount; b) receiving an input to initiate game play; c) allocating a portion of the wager amount to the progressive prize pool; d) displaying a set of one or more award indicia for winning a percentage of the progressive prize pool; e) receiving an input to display an additional set of award indicia; and f) receiving an input for selecting an award indicia, said input providing an opportunity to win a percentage of the progressive prize pool.

According to another aspect of the present invention, the method further comprises: (1) storing a predetermined top award for the fixed prize pool; (2) storing a predetermined average award for the fixed prize pool; and (3) determining the percentage of the entire fixed prize pool in the range of 0–100% based on the top award and the average award.

According to another aspect of the present invention, the method further comprises: (1) storing a top award win odds for the progressive prize pool; (2) storing a predetermined average award for the progressive prize pool; and (3) determining the percentage of the entire progressive prize pool in the range of 0–100% based on the top award win odds and the average award, such that the percentage selected is less than average contributions to the progressive prize pool in order to increase the progressive prize pool before the entire progressive prize pool is won.

According to another aspect of the present invention, a method of random payout from a prize pool is taught. The method is for use with at least one gaming device having a jackpot award, the gaming device being communicably coupled to a controller. The method comprises the following: (1) storing a predetermined top award for the prize pool; (2) storing a predetermined average award for the prize pool; and (3) determining a random award percentage in the range of 0–100% based on the top award, the average award, and a function of a random number such that an average of the random award percentages awarded over a number of plays is equal to a design jackpot award corresponding to the jackpot award win odds.

According to another aspect of the present invention, the method further comprises the random number is in an interval [0,1] inclusive.

According to another aspect of the present invention, the method further comprises the function is given by f(x) and is such that for a value "p" in the interval [0,1], a sum of expectations for awards for values of "x" less than "p" is equal a sum of expectations for awards for values of "x" greater than "p" and the value of f(p) is equal the desired average of the random award percentages.

According to another aspect of the present invention, a system of random payout from a prize pool is disclosed. The system utilizes a one or more gaming devices communicably coupled to a controller. Among other components, the system comprises: (1) a game device for receiving a wager amount; and for receiving an input to initiate game play; (2) means for qualifying the wager amount to win a percentage of the entire prize pool, the percentage of the entire prize pool being a function of a random number; and (3) the win being capable of occurring at the following periods: (a) during game play; or (b) after game play.

According to another aspect of the present invention, a system of random payout from a progressive prize pool is disclosed. The system employs one or more video gaming devices with display screens. The video gaming devices are communicably coupled to a controller. Among other components, the system comprises the following: (1) the video gaming device for receiving a wager amount and receiving an input to initiate game play; (2) means for contributing any one or more of a portion of the wager amount and a portion of non-gaming revenues to the progressive prize pool; and (3) means for qualifying the wager amount to win one or more additional awards from the progressive prize pool without regard to game out come.

According to another aspect of the present invention, a system of payout from a progressive prize pool is taught. The system employs a controller communicably coupled to one or more video gaming devices. Among other components, the system comprises: a) a video gaming device for receiving a wager amount and receiving an input to initiate game play; b) means for allocating a portion of the wager amount to the progressive prize pool; c) means for displaying a set of one or more award indicia for winning a percentage of the progressive prize pool; d) means for receiving an input to display an additional set of award indicia; and e) means for receiving an input for selecting an award indicia, said input providing an opportunity to win a percentage of the progressive prize pool.

Advantageously, the various embodiments of the present invention stimulate player interest, increase game play to lessen fall-off in progressive game play. Moreover, a larger progressive pool award on gaming devices with higher odds and frequency of winning jackpots is provided, and prize awards, that are hundreds of times greater than originally designed, without changing the odds of existing gaming devices are provided. Further, the present invention allows contribution to a progressive prize pool that will increase even when the gaming device is not being played, and offers progressive pool awards larger than those offered from gaming revenues only.

Figure 1:
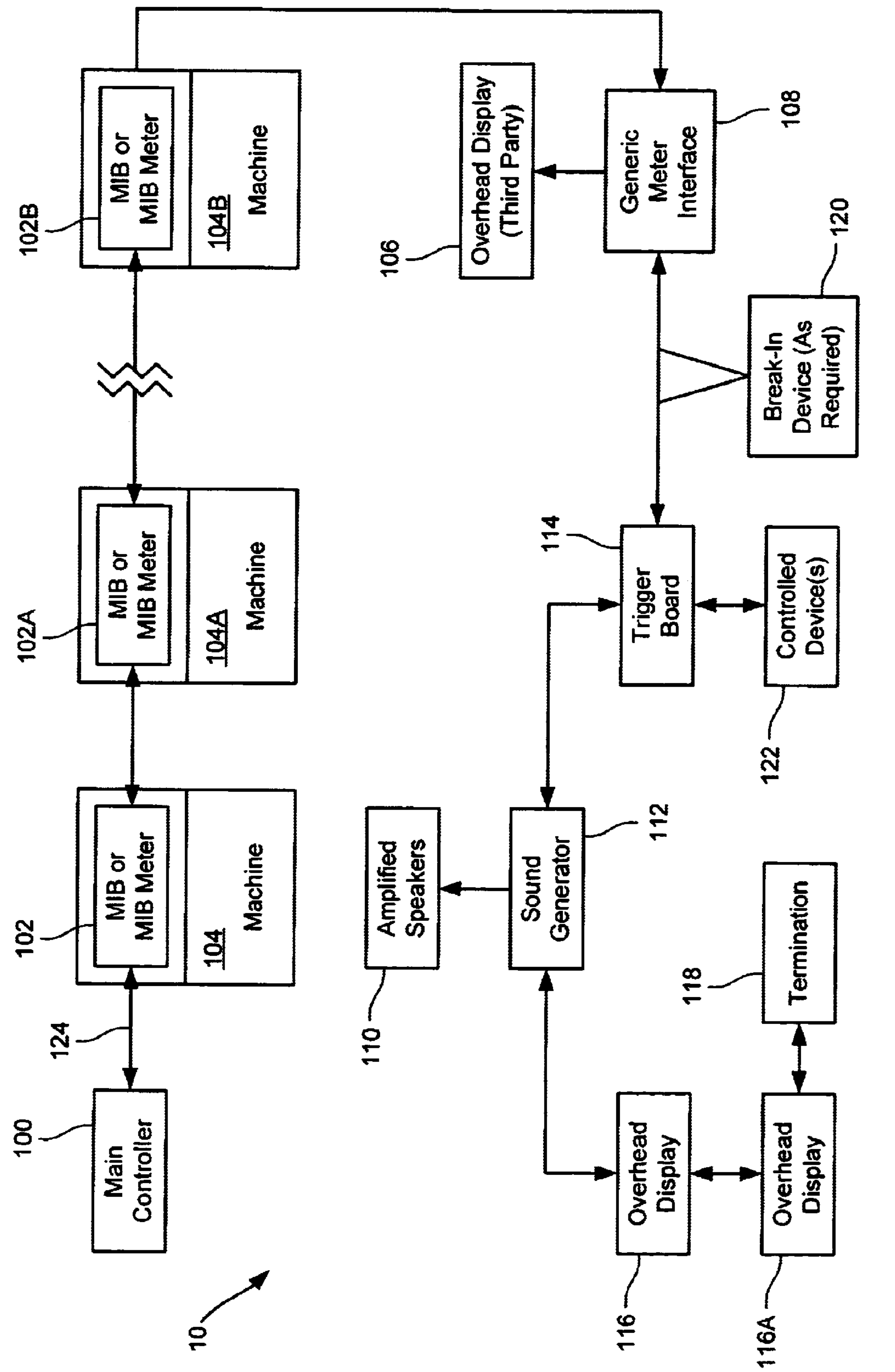
FIG. 1 (Prior Art)
FIG. 1 is a block diagram of a conventional gaming system for awarding payouts and prizes, the system being modifiable as proves necessary for implementing the various embodiments of the present invention.

A further understanding of the nature and advantages of the present invention herein may be realized by reference to the remaining portions of the specification and the attached drawings. Reference to the remaining portions of the specification, including the drawing and claims, will realize other features and advantages of the present invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Various embodiments of the present invention are disclosed with the common thread being that once a player bets at least one proper wager amount and initiates game play. The player becomes eligible to win one or more (randomly selected monetary percentages as a function of a random number from 0 to 100% of an entire prize pool) on any participating gaming device before, during or after game play with or without regard to game outcome. The randomly selected prize pool may be fixed or progressive.

In a first embodiment of the present invention, RPGM (random pay gaming method) is implemented as part of any novel programmable electronic or computer-controlled gaming devices that offer a primary game payout and a secondary prize pool payout, that can be used in conjunction with a typical networked gaming system. The novel gaming device, preferably has various output devices, including a display screen for displaying aspects of RPGM as described more thoroughly below. Other output devices may include audio outputs such as speakers, bells, whistles and the like, and signaling devices such as controllable lights and the like.

A number of types of input devices can be used by which the user can place wagers and/or play the game, including touch screen input devices, joysticks, mouse input devices, keyboards, buttons, levers and the like, as well as coin or currency acceptors and/or validators, card readers such as credit card readers, or other encoded-card readers. In a further embodiment, gaming terminals may be provided with communication devices, e.g., for purposes for accounting, maintenance, management, security, controls, updating and the like. It is common in the gaming industry to provide for novel gaming devices and those with skill in the art will understand how to construct and program such novel gaming devices to implement RPGM after reading and understanding the present descriptions.

FIG. 1 is a block diagram of a conventional gaming system 10 for awarding payouts and prizes. Among other components, gaming system 10 comprises a programmable main controller 100; one or more gaming devices 104, 104A, 104B; one or more Machine Interface Boards 102, 102A, 102B; one or more overhead displays 116, 116A or an existing display 106 with a generic display interface 108; an optional sound units 112; one or more trigger board units 114; and one or more "break in" devices 120 for system programming on the casino floor. Gaming system 10 may be utilized for implementing the present invention with various modifications as proves necessary to implement the invention.

In an alternate embodiment, the RPGM is implemented on one or more existing electronic or computer-controlled gaming devices. One or more gaming devices 104, 104A are coupled to a programmable main controller 100 over a communication network 124, which could be any suitable serial or parallel bus arrangement. Indeed, any communication link 124 could be utilized under the method of the present invention and the programmable (main controller) 100 could be located remotely from or within the gaming devices 104, 104A. At each gaming device 104 is a machine interface board 102 that interfaces between the conventional electronic circuitry of gaming device 104 and the communication network 124.

In this embodiment, with a need for no more than relatively minor modifications, any conventional electronic or computer-controlled gaming devices e.g. video games, spinning reel slot games, keno games, live card games with tables interfacing with electronic equipment, Internet and/or networked games, etc. that receives bets in order to play a game at the machine is contemplated to be used, under the methods of the present invention. The design and operation of gaming devices is well known and conventional gaming machines are available such as from International Gaming Technology™ and Bally™. Modifications to previous gaming devices for use in accordance with embodiments of the present invention can include, e.g., providing graphics, instructions, harnessing, prize indications and the like to inform players how to play the game, meter displays, etc. Furthermore, the main controller 100 can be any suitable computer-based controller.

Main controller 100 used can be any of a number of different controllers and computer based processing systems. How main controller 100 communicates with each gaming machine 104 over the communication network 124 is a matter of design choice and the protocols of communication are determined by the nature of the communication network 124 and the corresponding interface circuits.

Main controller 100 may optionally be connected over communication link 124 to another computer system, not shown. Furthermore, the network 124 in some embodiments is a telecommunications network such as a phone link, intranet, Internet, satellite, etc. In these embodiments, the gaming devices are implemented as game software in personal computers which are located in remote locations such as hotel/motel rooms, homes, etc. It is common in the gaming industry to provide for electronic gaming devices which will be appreciated by those skilled in the art, how to construct and program such networked gaming systems to implement the RPGM according to the present invention after reading and understanding the present descriptions.

As noted, among other components, RPGM employs a gaming device 104 a Main Controller 100 and means of displaying 116 a fixed or progressed distinct monetary prize pool amount on gaming device 104 and/or on the video screen (not shown) of gaming device 104 and/or showcased on a display 116 or 106 above the individual gaming device 104 or a group of gaming devices 104. Additional devices, such as amplified speakers 110, may be connected to generate sounds and indicators of win to stimulate play.

Any conventional means or any combination of any conventional means to display the entire amount of a monetary prize pool can be utilized under the method of the present invention which will be appreciated by those skilled in the art, such as in-game display meter video screen of gaming device 104, overhead display, plasma screen, etc.

Once a player bets the proper wager and initiates game play on any participating gaming device, the player becomes eligible to win one or more randomly selected monetary percentages of the entire prize pool displayed. Any conventional eligibility requirements or any combination of any conventional eligibility requirements can be utilized under the method of the present invention which will be appreciated by those skilled in the art, such as rate of play, max wager, insertion of player cards, one or more predetermined indicia, separate wager bet, etc.

The Random Pay Gaming Method utilizes a random number generator located in main controller 100 and/or in gaming device 104 to randomly select one or more monetary percentages as a function of a random number from 0 to 100% of a fixed or progressed prize pool with or with out regard to game outcome.

The monetary prize pool award that the player is eligible to win may or may not be displayed to the player prior to winning the prize pool award. For example, the prize pool award that the player is eligible to win can be display on the gaming devices monitor screen or in-game meter prior to winning the prize pool award. Or the prize pool award can be disguised as bonus indicia and not be displayed until after the player selects the proper winning bonus indicia.

In one embodiment in order to ensure player awareness, a predetermined amount minimum for the selected predetermined winning indicia for that gaming device is displayed. An award table and/or conventional display means on gaming device 104 always shows a predetermined minimum amount for the player. Once the player bets the proper wager an additional amount determined by a random number generator is displayed on a separate conventional display or added to the conventional display showing the minimum amount on the gaming device. The predetermined minimum amount is the amount of the gaming devices predetermined payout for the selected predetermined winning set of indicia, but a player also has the opportunity to win a bonus that is a randomly selected percentage of the entire prize pool.

In another embodiment the monetary prize pool award that the player is eligible to win is not displayed to the player until after the player has achieved a winning game outcome or completed certain bonus mode criteria. If the player wins a prize pool award, the payout, can be "paid out" by any conventional payout means which will be appreciated by those skilled in the art, such as by gaming device 104 through a currency chute or by increasing the amount of winnings shown in a credit window (not shown) of a gaming device and/or a hand pay by an attendant, etc. As noted, the prize pool may be fixed or progressive.

If the prize pool is fixed, a predetermined prize pool top award (100 percent) and a predetermined balancing point (average award) are stored in main controller 100. In order for main controller 100 to calculate the randomly selected average awards in the range of 0 to 100% of the entire prize pool.

If the prize pool is progressive, a predetermined progressive prize pool top award (100%) win odds and a predetermined balancing point (average award) are stored in main controller 100. Main controller 100 calculates the randomly selected average progressive awards in the range of 0 to 100% of the progressive prize pool, so that the average progressive awards are less than the average progressive contributions to the progressive prize pool in order for the progressive prize pool to increase to a larger size (top award win odds) before the entire progressive prize pool is won.

If the prize pool is progressive, main controller 100 increments a predetermined percentage of each gaming wager from one or more gaming devices and/or a percentage of non-gaming revenues e.g., rooms, food, beverage, etc., to the total progressive prize pool amount.

If the player wins a progressive prize pool award, the percent of the progressive prize pool won is deduced from the amount showing on the progressed prize pool display. The unwon amount of the progressive prize pool remains displayed and the unwon amount is carried over for the next opportunity to win a percentage of the progressive prize pool. The progressive prize pool is reset to a predetermined monetary base value only after a player wins 100% of the prize pool.

If gaming devices with different pay tables and/or denominations are playing for the same prize pool awards, main controller 100 will also store hit frequency and wager information from each gaming device 104 coupled to the networked gaming system so that the award algorithm will display amounts that average properly for each machine.

When the RPGM is used on an existing gaming device that already has a predetermined pay table, in order for the RPGM to function properly, a predetermined prize pool top award (100 percent) and a predetermined balancing point (average award) are stored in main controller 100. In order for main controller 100 to calculate the randomly selected average awards in the range of 0 to 100% of the entire prize pool, the percentage of the prize pool awarded is a function of a random number such that the average prize pool awarded over a number of plays equals the designed jackpot award of gaming device 104 being played.

For example, a gaming device has a designed top award of $10,000, a minimum jackpot pay amount of $5,000 and a jackpot pool amount of $100,000. In order for the sum of the minimum jackpot amount ($5,000) and the average pool award to equal the designed jackpot award of $10,000, the sum of expectations of jackpot pool awards above $5,000 must equal the sum of expectations of jackpot pool awards below $5,000 in order for the designed pay table award of $10,000. Expectation is the product of the amount awarded times the probability of winning that award as defined by the random number generator.

A method of calculating a percentage of jackpot pool is such that the percentage in the range 0%–100% is a function f(x) of a random number x in an interval [0,1]. The function f(x) is such that for some value p in the interval [0,1], the sum of expectations for awards f(x) for values of x less that p must equal the sum of expectations for awards f(x) for values of x greater than p and the value of f(p) must equal the desired average jackpot award. Expectations may be defined by discrete values in a table of award percentages or a continuous function may be used.

The function $f(x)=ae^{-CX}$ meets these requirements for appropriate values of a and c. For example, if a=102*JPavg and c=199 a maximum jackpot of 102 times average may be offered. A value greater than JPavg will be offered as a bonus whenever the random number x is less than 0.0266. Although not shown, one of ordinary skill in the art will understand that other functions consistent with the scope and spirit of the present invention may be utilized. Unlike conventional gaming devices, the above function allows award of jackpots hundreds of times greater than originally designed when used with existing gaming devices.

In an alternate embodiment, the player invests the required amount into gaming device 104 and initiates game play. At the time gaming device 104 receives the required wager amount to qualify the player for the prize pool award, main controller 100 calculates a randomly selected monetary percentage amount of the prize pool and this amount is displayed on gaming device 104 for this play only. If gaming device 104 based on its internal workings, selects the proper predetermined set of winning indicia the player is awarded a predetermined amount minimum for the selected predetermined winning set of indicia. Furthermore, the player is also rewarded the percentage of the prize pool amount displayed on gaming device 104. If gaming device 104 does not select the proper predetermined set of winning indicia to win the prize pool amount displayed on gaming device 104. The display on gaming device 104 will changes to the minimum amount for that machine and/or display various attractions to stimulate game play.

In another embodiment when the player invests the required wager amount into a video gaming device (not shown) and initiates game play, the player becomes eligible to win one or more progressive bonus awards from a randomly selected bonus percentage of the progressive prize pool without regard to game outcome. In this embodiment, a novel feature is that the bonus awards, non-bonus awards and game terminators are disguised and randomly appear and disappear and/or move across the video monitor screen and the player has the opportunity to win the disguised bonus awards by touching and exposing (through video touch screen technology) as many of the disguised bonus indicia as possible before the bonus award cycle ends and/or the player touches a bonus cycle terminator.

When main controller 100 increments to the progressive prize pool one or more predetermined monetary amounts of contribution from one or more video gaming devices and/or non-gaming revenues, main controller 100 triggers a bonus cycle. Main controller 100 then randomly selects one monetary bonus award percentage from the prize pool, and then selects one or more bonus awards, then randomly selects one or more non-bonus awards and randomly selects 0 or more bonus cycle terminators. Main controller 100 also divides the percentage of the bonus award selected into the number of bonus awards selected.

The number of bonus awards selected that the bonus award percentage is divided into and the number of non-bonus awards and the number of game terminators that main controller 100 randomly selects are from a predetermined number of possibilities. For example, 10 bonus awards are stored in main controller 100, main controller 100 selects between 1 and 10 bonus awards that the bonus award percentage is divided into. Main controller 100 randomly selects 5 bonus awards and divides the bonus award percentage into the 5 bonus awards. 10 non-bonus awards are stored in main controller 100, main controller 100 randomly selects between 1 and 10 non-bonus awards. Main controller 100 selects 6 non-bonus awards. 5 game terminators are stored in main controller 100, main controller 100 randomly selects between 0 and 5 game terminators. Main controller 100 randomly selects 2 game terminators.

Once main controller 100 has randomly selected one or more bonus awards and has selected one or more non-bonus awards and has selected 0 or more bonus cycle terminators, main controller 100 detects which of the video gaming devices on the networked gaming system has received the required wager amount. Once main controller 100 has identified the qualified video gaming machines, main controller 100 then randomly selects one of the qualified video gaming devices on the network gaming system for a random bonus cycle. After main controller 100 has selected the qualified video gaming device, main controller 100 transfers this information to the properly programmed video gaming device and triggers and bonus cycle for that gaming device.

The properly programmed video gaming device then disguises the bonus award percentages, non-bonus awards, and game terminators as indicia (e.g., card back, ducks, balloons, etc.). Gaming device 104 then resumes the bonus cycle and the disguised indicia randomly appear and disappear and/or move across the video monitor screen, before, during or after game play. The rate of speed that the disguised indicia randomly appear and disappear and/or move across the video monitor screen is a pre-selected rate that is stored in the video gaming machine. As the disguised indicia randomly appear and disappear and/or move across the video monitor screen, the player has the opportunity to win the disguised bonus awards by touching and exposing (through video touch screen technology) as many of the disguised bonus indicia as possible before the bonus award cycle ends and/or the player touches a bonus cycle terminator. The bonus awards percentages exposed by the player on the gaming machines video screen are awarded to the player once the bonus cycle comes to an end. The bonus award percentages won are then deducted from the total amount of the progressed prize pool.

The bonus cycle come ends once the randomly selected disguised indicia all disappear from the gaming machines video screen. The bonus cycle comes to an end also when a bonus cycle terminator is exposed. The bonus cycle comes to an end also when a player exposes a bonus award that is 100 percent of the entire prize pool. Once a player wins 100 percent of the progressed prize pool, the prize pool will be reset to a predetermined monetary base value. The bonus cycles have no effect on gaming device 104's normal game play outcome.

In another embodiment the player provides the required amount into a video gaming device and initiates game play. If gaming device 104 based on its internal workings, selects one or more predetermined winning indicia, the player qualifies for a secondary bonus game. The bonus game works similar to the bonus game described above except for, the disguised indicia that are displayed on gaming device 104 are static. For example, five card back are displayed on gaming device 104, which are disguising the randomly selected bonus awards, non-bonus awards and game terminators. At this time the player has the opportunity to select and expose the bonus awards, non-bonus awards and game terminators. The bonus cycle come to an end once all the card backs are exposed or the player selects a game terminator or 100% of the entire bonus prize pool is won. The player is awarded the bonus awards once the bonus game comes.

In a further embodiment of the one just described above, once the player has qualified for a bonus award for example, the five card backs are displayed to the player for selection. The player is given the option to bet on one or more opportunities to win a bonus prize pool award. If the player chooses to bet a predetermined wager on extra bonus opportunities, then five more card backs are displayed with the other five card back. This process is carried on until the player decides to quite betting or reaches a set limit to the number of bonus opportunities available. Once the player is ready to begin the bonus game. The player can select any of the card backs in any order that the player desires. The bonus cycle come to an end once all the card backs are exposed or the player selects a game terminator or 100% of the entire bonus prize pool is won. The player is awarded the bonus awards once the bonus game comes to an end through conventional means.

Yet in a further embodiment, when the player has qualified for a bonus award, each time the player bet on the opportunities to win another bonus prize pool award, the total percentage of previous bonus prize pool opportunity is shown to the player. The player has a chance to see what the total percentage of the prize pool hidden behind the disguised indicia is before trying to win it.

While the above is a complete description of exemplary specific embodiments of the invention, additional embodiments are also possible. For example, the RPGM may relate to any novel or conventional electronic or computer-controlled gaming devices e.g. video games, spinning reel slot games, keno games, etc that offer a primary game payout and a secondary prize pool payout that can be used in conjunction with a typical networked gaming system, and may be used in non-gaming environment for prize give a ways. Thus, the above description should not be taken as limiting the scope of the invention, which is defined by the appended claims along with their full scope of equivalents.

What is claimed is:

1. In a gaming network having a gaming device and a progressive prize pool containing a portion of wager amounts received at the gaming device, a method of awarding payouts from the progressive prize pool, the method comprising:

receiving, by the gaming device, a wager amount;

receiving an input to initiate game play;

allocating a portion of the wager amount to the progressive prize pool; and qualifying the wager amount to win a random amount from the progressive prize pool, wherein the random amount selected is based on at least an average award.

2. The method of claim 1 wherein the random amount of the progressive prize pool is a function of a random number; and if the selected amount from the progressive pool is won, reducing the progressive prize pool by the amount won.

3. The method of claim 1, wherein the random amount is randomly selected by at least one of the gaming device and a controller coupled to the gaming device.

4. A method of random payout from a prize pool using a gaming device, the method employing a network having one or more gaming devices communicably coupled to a controller, the method comprising:

receiving a wager amount;

receiving an input to initiate game play; and qualifying the wager amount to win a random amount of the prize pool, the random amount of the prize pool being a function of a random number and at least average award and being selected by the controller; and the win being capable of occurring at the following periods: (a) during game play; or (b) after game play.

5. The method of claim 4, wherein the random amount is randomly selected by at least one of the gaming device and a controller coupled to the gaming device.

6. The method of claim 4 further comprising selecting the amount of the prize pool without regard to game play outcome.

7. The method of claim 5 further comprising displaying a first payout amount corresponding to a selected winning indicia for the gaming device only after a winning game outcome is established.

8. The method of claim 4 further comprising incrementing a portion of the wager amount contributed to the progressive prize pool.

9. The method of claim 4 further comprising displaying a first payout amount corresponding to a selected winning indicia for the gaming device; and after receiving a wager amount, providing an opportunity to win a second payout amount corresponding to the selected winning indicia.

10. The method of claim 4 further comprising if an amount less than 100% is won, reducing the progressive prize pool by the amount won to determine an unwon amount;

carrying over the unwon amount for a next opportunity to win an amount of the progressive prize pool.

11. The method of claim 4 further comprising at the time of receiving the wager amount, calculating a monetary amount of the amount of the prize pool; and displaying the monetary amount for the game play only.

12. The method of claim 11 further comprising selecting a predetermined winning indicia;

awarding a predetermined payout amount corresponding to the winning indicia; and awarding the monetary amount for the game play only.

13. The method of claim 4 wherein the prize pool is fixed.

14. The method of claim 13 further comprising storing a top award for the fixed prize pool;

storing an average award for the fixed prize pool; and determining the percentage of the fixed prize pool in the range of 0–100% based on the top award and the average award.

15. The method of claim 14, further comprising:

storing a minimum award for the fixed prize pool; and wherein determining the percentage comprises determining the percentage of the fixed prize pool in the range of 0–100% based on the top award, the average award, and the minimum award.

16. The method of claim 4 wherein the prize pool is progressive.

17. The method of claim 16 further comprising allocating portions of the wager amounts to the progressive prize pool; and when the portions of wager amounts reach a predetermined amount, triggering a bonus cycle.

18. The method of claim 16 further comprising allocating a portion of the wager amount to the progressive prize pool.

19. The method of claim 16 comprising allocating a portion of non-gaming revenues to the progressive prize pool.

20. The method of claim 16 further comprising displaying a bonus indicia for the amount of the progressive prize pool, the amount being displayed only after a winning bonus indicia is selected.

21. The method of claim 16 further comprising displaying a first payout amount corresponding to a selected winning indicia for the gaming device; and after receiving a wager amount, providing an opportunity to win a second payout amount corresponding to the selected winning indicia.

22. The method of claim 16 further comprising storing a top award probability for the progressive prize pool;

storing an average award for the progressive prize pool; and determining the amount of the progressive prize pool in the range of 0–100% based on the top award probability and the average award, such that the amount selected is less than average contributions to the progressive prize pool in order to increase the progressive prize pool before the entire progressive prize pool is won.

23. The method of claim 22, further comprising:

storing a minimum award for the fixed prize pool; and wherein determining the amount comprises determining the amount of the progressive prize pool in the range of 0–100% based on the top award probability, the average award, and the minimum award.

24. A method of random payout from a progressive prize pool, the method employing one or more gaming devices with at least one display screen, the gaming devices being communicably coupled to a controller, the method comprising:

receiving, by the gaming device, a wager amount;

receiving an input to initiate game play;

contributing a portion of the wager amount to the progressive prize pool; qualifying the wager amount to win all or part of a random amount selected from the progressive prize pool for a game play;

determining one or more bonus awards for the random amount selected; and separating the random amount selected from the progressive prize pool into the one or more bonus awards determined.

25. The method of claim 24 further comprising providing a bonus award cycle for displaying the one or more bonus awards.

26. The method of claim 25 wherein the one or more bonus awards are static or dynamic.

27. The method of claim 25 further comprising when one or more bonus awards are won, deducting a total amount corresponding to the one or more bonus awards from a total amount of the progressive prize pool.

28. The method of claim 25 wherein providing a bonus award cycle further comprises storing a predetermined amount contributed to the progressive prize pool from the gaming device; and triggering a bonus cycle when the predetermined amount is reached.

29. The method of claim 25 wherein the one or more bonus awards are selected from at least one of a bonus award, a non-bonus award and a bonus award cycle terminator.

30. The method of claim 29 further comprising displaying the bonus award, the non-bonus award and the bonus award cycle terminator as indicia.

31. The method of claim 30 further comprising receiving one or more inputs for selecting as many of the indicia prior to expiration of the bonus award cycle.

32. The method of claim 31 wherein receiving one or more inputs further comprises receiving an input that selects the bonus award cycle termination award, the input terminating the bonus award cycle.

33. A method of payout from a progressive prize pool, the method comprising:

a) receiving, by a video gaming device, a wager amount;

b) receiving an input to initiate game play;

c) allocating a portion of the wager amount to the progressive prize pool;

d) displaying a set of one or more award indicia, the set for winning a randomly selected amount of the progressive prize pool based on at least an average award;

e) receiving an input for selecting an award indicia in the one or more award indicia, said input providing an opportunity to win the randomly selected amount of the progressive prize pool.

34. The method of claim 33 wherein e) further comprises receiving an input from a player to display the additional set of award indicia for an additional wager amount; and repeating d) through e) until a maximum wager amount is reached.

35. The method of claim 33 further comprising after e), displaying the random amount selected for the progressive prize pool for d).

36. A method of random payout from a prize pool, the method for use with at least one gaming device having a jackpot award, the method comprising:

storing a top award for the prize pool;

storing an average award for the prize pool;

receiving a wager amount;

receiving an input to initiate game play; and determining a random award percentage in the range of 0–100% based on the top award, the average award, and a function of a random number such that an average of the random award percentages awarded over a number of plays is equal to a designated jackpot award corresponding to the jackpot award probability.

37. The method of claim 36, further comprising:

storing a minimum award for the fixed prize pool; and wherein determining the random award percentage comprises determining a random award percentage in the range of 0–100% based on the top award, the average award, the minimum award, and a function of a random number.

38. The method of claim 36 wherein the function is given by f(x) and is such that for a value "p" in the interval [0,1], a sum of expectations for awards for values of "x" less than "p" is equal to a sum of expectations for awards for values of "x" greater than "p" and the value of f(p) is equal the desired average of the random award percentages.

39. A system of random payout from a prize pool, the system employing a one or more gaming devices communicably coupled to a controller, the system comprising:

a game device for receiving a wager amount, and for receiving an input to initiate game play;

means for qualifying the wager amount to win an amount of the prize pool, the amount of the prize pool being a function of a random number and at least an average award; and the win being capable of occurring at the following periods: (a) during game play; or (b) after game play.

40. The system of claim 39 further comprising means for selecting the amount of the entire prize pool without regard to game play outcome.

41. A system of random payout from a progressive prize pool, the system employing one or more gaming devices with at least one display screen, the gaming devices being communicably coupled to a controller, the system comprising:

the gaming device for receiving a wager amount and for receiving an input to initiate game play;

means for contributing at least a portion of the wager amount and a portion of non-gaming revenues to the progressive prize pool; and means for qualifying the wager amount to win one or more additional awards from the progressive prize pool without regard to game outcome.

42. The system of claim 41 further comprising means for providing a bonus award cycle for displaying the one or more additional awards.

43. A system of payout from a progressive prize pool, the system employing a controller communicably coupled to one or more gaming devices, the system comprising:

a) a gaming device for receiving a wager amount;

b) means for allocating a portion of the wager amount to the progressive prize pool;

c) means for displaying a set of one or more award indicia, the set for winning a randomly selected amount of the progressive prize pool based on at least an average award; and d) means for receiving an input for selecting an award indicia in the one or more award indicia, said input providing an opportunity to win the randomly selected amount of the of the progressive prize pool.

44. A system of random payout from a prize pool, the system for use with at least one gaming device having a jackpot award, the gaming device being communicably coupled to a controller, the system comprising:

means for storing a predetermined top award for the prize pool;

means for storing a predetermined average award for the prize pool;

means for receiving a wager amount; and means for determining a random award percentage in the range of 0–100% based on the top award, the average award, and a function of a random number such that an average of the random award percentages awarded over a number of plays is equal to the jackpot award.

45. The method of claim 44, wherein the random award percentage is randomly selected by at least one of the at least one gaming device and a controller coupled to the at least one gaming device.

46. A method of random payout from a progressive prize pool, the method employing a network having one or more gaming devices communicably coupled to a controller, the method comprising:

storing a predetermined average award for the progressive prize pool; and providing as a random payout, a percentage of the entire progressive prize pool in the range of 0–100% based on the average award, and such that the percentage selected is less than average contributions to the progressive prize pool in order to increase the progressive prize pool before the entire progressive prize pool is won.

47. The method of claim 46 further comprising storing a predetermined top award probability for the progressive prize pool prior to determining the random amount of the prize pool.

48. A method of random payout from a progressive prize pool, the method comprising:

receiving a wager amount;

receiving an input to initiate game play; and qualifying the wager amount to win a random amount of the prize pool, the random amount of the prize pool being a function of a random number; and allocating a portion of the non-gaming revenues to the progressive prize pool.

49. A method of random payout from a progressive prize pool, the method comprising:

receiving a wager amount;

receiving an input to initiate game play; and qualifying the wager amount to win a random amount of the prize pool, the random amount of the prize pool being a function of a random number; and displaying a bonus indicia for the amount of the progressive prize pool, the amount being displayed only after a winning bonus indicia is selected.

50. A method of random payout from a progressive prize pool, the method comprising:

receiving a wager amount;

receiving an input to initiate game play; and qualifying the wager amount to win a random amount of the prize pool, the random amount of the prize pool being a function of a random number; and displaying a first payout amount corresponding to a selected winning indicia for the gaming device; and after receiving a wager amount, providing an opportunity to win a second payout amount corresponding to the selected winning indicia.

51. A method of random payout from a prize pool, the method comprising:

receiving a wager amount;

receiving an input to initiate game play; and qualifying the wager amount to win a random amount of the prize pool, the random amount of the prize pool being a function of a random number; and displaying a first payout amount corresponding to a selected winning indicia for the gaming device only after a winning game outcome is established.

52. A method of random payout from a progressive prize pool, the method comprising:

receiving a wager amount;

receiving an input to initiate game play; and qualifying the wager amount to win a random amount of the prize pool, the random amount of the prize pool being a function of a random number; and incrementing the portion of the wager amount to the progressive prize pool.

53. A method of random payout from a prize pool, the method comprising:

receiving a wager amount;

receiving an input to initiate game play; and qualifying the wager amount to win a random amount of the prize pool, the random amount of the prize pool being a function of a random number;

displaying a first payout amount corresponding to a selected winning indicia for the gaming device; and after receiving a wager amount, providing an opportunity to win a second payout amount corresponding to the selected winning indicia.

54. A method of random payout from a prize pool, the method comprising:

receiving a wager amount;

receiving an input to initiate game play; and qualifying the wager amount to win a random amount of the prize pool, the random amount of the prize pool being a function of a random number;

at the time of receiving the wager amount, calculating a monetary amount of the percentage of the prize pool; and displaying the monetary amount for the game play only.

55. The method of claim 54 further comprising selecting a predetermined winning indicia;

awarding a predetermined payout amount corresponding to the winning indicia; and awarding the monetary amount for the game play only.

56. A method of random payout from a progressive prize pool, the method comprising:

receiving a wager amount;

receiving an input to initiate game play;

qualifying the wager amount to win a random amount of the prize pool, the random amount of the prize pool being a function of a random number;

if a percentage less than 100% is won, reducing the progressive prize pool by an amount won to determine an unwon amount;

carrying over the unwon amount for a next opportunity to win an amount of the progressive prize pool.

57. A method of random payout from a progressive prize pool, the method employing one or more gaming devices with at least one display screen, the method comprising:

receiving, by the gaming device, a wager amount;

receiving an input to initiate game play;

contributing a portion of the wager amount to the progressive prize pool; and qualifying the wager amount to win one or more additional awards from the progressive prize pool;

storing a predetermined amount contributed to the progressive prize pool from the gaming device; and triggering a bonus cycle for displaying the one or more additional awards when the predetermined amount is reached.

58. A gaming device for awarding amount from a prize pool containing a portion of wager amounts received at the gaming device, the device comprising:

a receiver configured to receive a wager amount;

an input configured to receive an input to initiate game play; and a controller configured to qualify the wager amount to win a random amount of the progressive prize pool, wherein the random amount being selected is based on at least an average award.

59. The gaming device of claim 58, wherein the random amount being selected based on the average award is further based on a maximum award and minimum award.

60. The gaming device of claim 58, wherein the controller selects the random amount based on a function that uses the average award that is equal or less than an amount contributed to the progressive prize pool.

61. The gaming device of claim 58, wherein the controller is remotely coupled to the gaming device.

62. The gaming device of claim 58, wherein the prize pool is a progressive prize pool.

63. The gaming device of claim 62, further comprising an allocator configured to allocate a portion of the wager amount to the progressive prize pool, wherein the amount allocated over a number of game plays is more than random amounts paid.

64. The gaming device of claim 58, wherein the prize pool is a fixed prize pool.

65. The gaming device of claim 64, wherein the controller is configured to award random amounts for a number of game plays that is equal to a designated jackpot award.

66. A system for awarding amount from a prize pool containing a portion of wager amounts received, the system comprising:

one or more gaming devices, wherein a gaming device in the one or more gaming devices is configured to receive a wager amount and an input to initiate game play; and a controller coupled to the one or more gaming devices, the controller configured to qualify the wager amount to win a random amount of the progressive prize pool, wherein the random amount being selected is based on at least an average award.

67. The system of claim 66, wherein the random amount being selected based on the average award is further based on a maximum award and minimum award.

68. The gaming device of claim 66, wherein the controller selects the random amount based on a function that uses the average award desired over a number of game plays.

69. The system of claim 66, wherein the controller is configured to qualify multiple wagers from the one or more gaming devices, wherein each wager is qualified to win a random amount of the progressive prize pool, wherein the random amounts awarded for the multiple wager are substantially equal to the average award.

* * * * *